(12) United States Patent
Nusier et al.

(10) Patent No.: US 10,300,954 B2
(45) Date of Patent: May 28, 2019

(54) DUAL A-PILLAR OR AUTONOMOUS VEHICLES

(71) Applicant: Ford Global Technologies, LLC, Dearborn, MI (US)

(72) Inventors: Saied Nusier, Canton, MI (US); Mohamed Ridha Baccouche, Ann Arbor, MI (US); Saeed David Barbat, Novi, MI (US); Jamel E. Belwafa, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/719,878

(22) Filed: Sep. 29, 2017

(65) Prior Publication Data
US 2019/0100247 A1  Apr. 4, 2019

(51) Int. Cl.
*B62D 25/04* (2006.01)
*B62D 25/02* (2006.01)
*B60N 2/005* (2006.01)
*B62D 27/02* (2006.01)
*G05D 1/00* (2006.01)

(52) U.S. Cl.
CPC ............. *B62D 25/04* (2013.01); *B60N 2/005* (2013.01); *B62D 27/02* (2013.01); *G05D 1/0088* (2013.01)

(58) Field of Classification Search
CPC ........ B62D 25/02; B62D 27/02; B62D 25/04; B60J 5/04; B60J 5/0479
USPC ..... 206/203.01, 203.03, 96.18, 6.21, 193.06, 206/203.02, 187.1, 187.09
See application file for complete search history.

(56) References Cited

U.S. PATENT DOCUMENTS

| | | | |
|---|---|---|---|
| 8,297,674 B2 * | 10/2012 | She | B60R 13/025 296/1.02 |
| 8,439,510 B2 | 5/2013 | Uematsu et al. | |
| 9,840,221 B2 * | 12/2017 | England | B60R 21/213 |
| 2006/0202520 A1 * | 9/2006 | Osterberg | B62D 25/06 296/210 |
| 2010/0001496 A1 * | 1/2010 | Schirm | B60R 21/213 280/730.2 |
| 2011/0156445 A1 | 6/2011 | Labbe et al. | |
| 2014/0259938 A1 * | 9/2014 | Choi | B60J 5/0468 49/226 |
| 2015/0203158 A1 * | 7/2015 | Oxley | B62D 27/02 296/203.03 |
| 2015/0375800 A1 * | 12/2015 | Wagner | B62D 29/046 296/187.03 |

FOREIGN PATENT DOCUMENTS

| | | | |
|---|---|---|---|
| EP | 1712452 | | 10/2006 |
| GB | 2408025 | * | 5/2005 |

* cited by examiner

*Primary Examiner* — Dennis H Pedder
(74) *Attorney, Agent, or Firm* — Vichit Chea; Brooks Kushman, P.C.

(57) ABSTRACT

A vehicle is provided. The vehicle may include a first A-pillar, spanning between a roof rail and shotgun, and a frame assembly. The first A-pillar may carry a windshield. The frame assembly may include a second A-pillar, spanning between the roof rail and a hinge pillar, and a C-pillar. The frame assembly may define a side ingress/egress opening of a cabin having a rearward-facing front seat. The opening may span between the second A-pillar and C-pillar without a B-pillar.

11 Claims, 5 Drawing Sheets

DUAL A-PILLAR OR AUTONOMOUS VEHICLES

TECHNICAL FIELD

This disclosure relates to A-pillar beams for autonomous vehicles that are used to dissipate loads.

BACKGROUND

Contemporary automobiles often include two or more front-row seats oriented towards the front of the vehicle. For various reasons, it may be advantageous to position one or more of the front-row seats towards the rear of the vehicle. For instance, autonomous vehicles or self-driving cars capable of sensing the surrounding environment and navigating without human input may include a rearward facing front seat. Because the occupant or "driver" is not operating the vehicle, the typical forward facing seat may be done away with.

SUMMARY

According to one embodiment of this disclosure, a vehicle is provided. The vehicle may include a first A-pillar, spanning between a roof rail and shotgun, and a frame assembly. The first A-pillar may carry a windshield. The frame assembly may include a second A-pillar, spanning between the roof rail and a hinge pillar, and a C-pillar. The frame assembly may define a side ingress/egress opening of a cabin having a rearward-facing front seat. The opening may span between the second A-pillar and C-pillar without a B-pillar.

An angle between the first A-pillar and a plane defined by a top of the hinge pillar is less than an angle between the second A-pillar and the plane.

The first A-pillar, the second A-pillar, the hinge pillar, the shotgun, and shotgun attachment bracket may define a closed structural truss.

The second A-pillar may be mounted to the first A-pillar by an upper connection bracket.

The upper connection bracket may include a first concave flange portion that is attached to the first A-pillar and a second concave flange portion attached to the second A-pillar.

The second A-pillar may be mounted to the hinge pillar by a lower connection bracket.

According to another embodiment of this disclosure, a vehicle is provided. The vehicle may include a first A-pillar, spanning between a roof rail and shotgun, and a frame assembly. The first A-pillar may carry a windshield. The frame assembly may include a second A-pillar, spanning between the roof rail and a hinge pillar, and a C-pillar. The frame assembly may define a side ingress/egress opening of a cabin. The opening may span between the second A-pillar and C-pillar without a B-pillar. The first and second A-pillars may define a truss.

The cabin may include a rearward facing front seat and a forward facing rear seat.

According to yet another embodiment of this disclosure a vehicle is provided. The vehicle may include a first A-pillar, spanning between a roof rail and a front support member, and a frame assembly. The first A-pillar may carry a windshield. The frame assembly may define a side ingress/egress opening of a cabin. The opening may span between the second A-pillar and C-pillar without a B-pillar.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
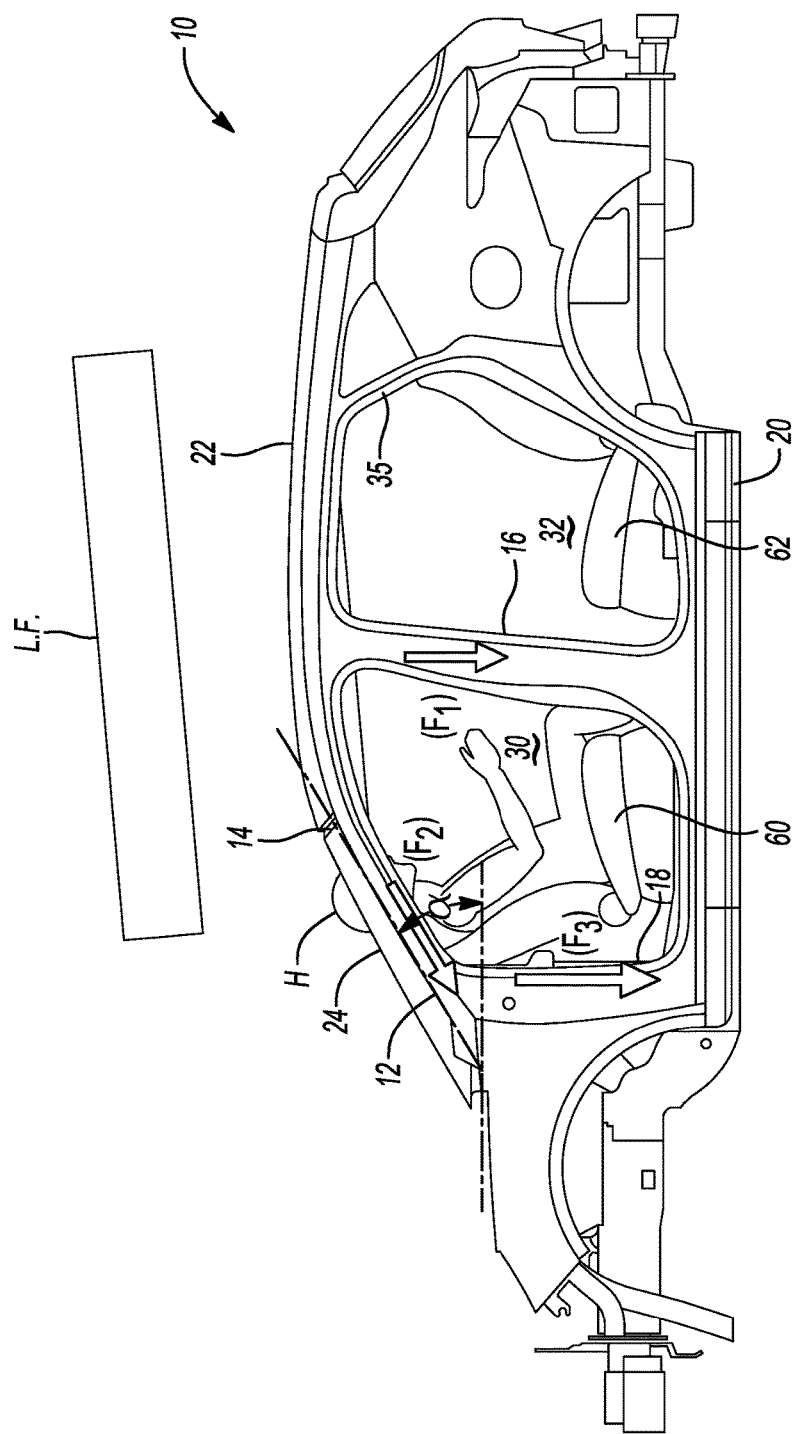
FIG. 1 is a plan view of a vehicle including an A-pillar typical of the prior art and a roof crush load form applied to the vehicle roof.

Referring to FIG. 1, a plan view of a vehicle frame 10 typical of the prior art is illustrated. The prior-art vehicle frame 10 includes a single A-pillar 12 disposed along the angle α and connected to the roof rail 14. The angle α may range from 20 degrees to 45 degrees with respect to the hinge pillar. The A-pillar 12 may extend from a support member, e.g., shotgun bracket (not illustrated) or hinge pillar 18 to the roof rail 14. The hinge pillar 18 is arranged vertically with respect to a rocker panel 20, that the hinge pillar 18 is connected to. A B-pillar 16 connects the roof 22 and the rocker panel 20. The B-pillar 16, the A-pillar 12, and hinge pillar 18 define a first ingress/egress opening 30. The B-pillar 16 and the C-pillar 35 define a second ingress/egress opening 32.

The vehicle frame 10 defines a cabin or interior portion that includes a first row of seats and a second row of seats. A first or front row rearward-facing seat 60 is disposed within the cabin, defined by the frame, and is in line or proximal to the first ingress/egress opening 30. As was previously mentioned, a vehicle such as an autonomous vehicle may include a first-row rearward-facing seat to allow an occupant in the first-row to face a rear-seated occupant. A second or back row forward-facing seat 62 is disposed within the cabin, defined by the frame, and is in line or proximal to the second ingress/egress opening 32. An occupant is seated within the first-row rearward-facing seat 60. Because of the angle α of the A-pillar 12, the occupant's head H extends through the front window 24 of the vehicle frame 10.

A load form (L.F.) (sometimes referred to as a platen) used in a static roof test is positioned above the vehicle frame 10. One exemplary test, FMVSS No. 216, requires that the platen is placed in contact with the roof 22 of the vehicle frame 10 and then pressed downward, simulating contact of the roof with the ground during a rollover crash, with steadily increasing force until a force equivalent to 3.0 times the unloaded weight of the vehicle is reached and the head resultant force is less than 50 lbs. FMVSS No. 216 limits the distance the test plate moves to 127 mm (5 inches) from the point of contact. As the load is applied, the force $F_1$ is transferred from the roof through the B-pillar 16, the force $F_2$ is transferred through the A-pillar 12, and the force $F_3$ is transferred through the hinge pillar 18. Note the load path $F_2$ creates a bending moment about the intersection point between the hinge pillar 18 and the A-pillar 12. As will be described in greater detail below, the vehicle frame 10 displaces approximately 3.75 inches in response to a load of 17.5 Kip.

Figure 2:
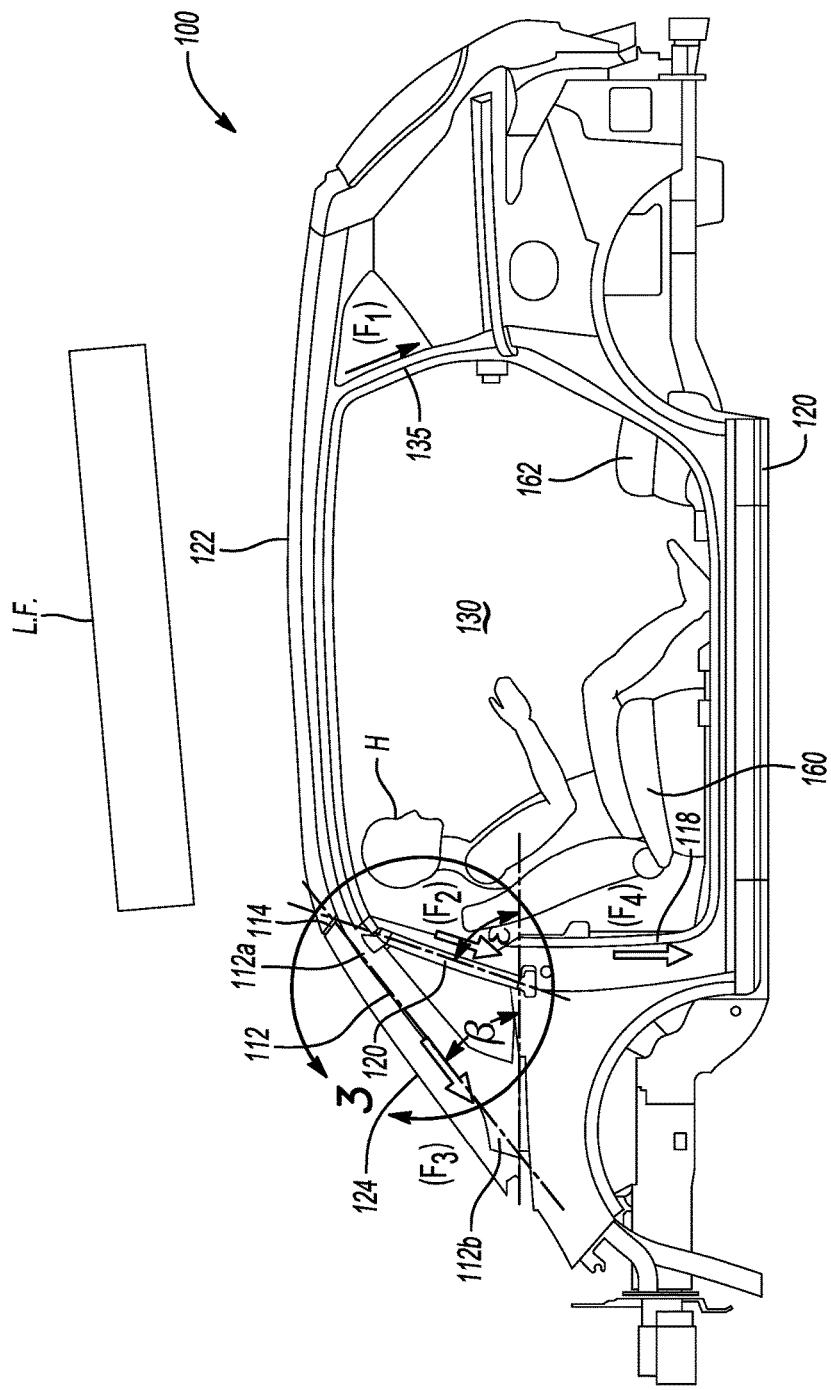
FIG. 2 is a plan view of an autonomous vehicle frame including a dual A-pillar beam assembly and a roof crush load form applied to the vehicle roof.

Referring to FIG. 2, a plan view of a vehicle frame 100 is illustrated. The vehicle frame 100 may be for an autonomous vehicle or a conventional vehicle. The vehicle includes at least one rearward-facing first row seat 160 and at least one forward facing second row seat 162. The vehicle frame 100 includes a roof 122 that extends between a roof rail 114 and a C-pillar 135. The roof rail 114 connects a first A-pillar 112 to a shotgun bracket or front support member (not shown). A rocker panel 121, extends between the hinge pillar 118 and the C-pillar 135, defines a lower portion of an ingress/egress opening 130 of the frame 100. The roof 122 that extends between the first A-pillar 112 and the C-pillar 134 defines an upper portion of the ingress/egress opening 130.

The first A-pillar 112 carries or supports a windshield 124 and is disposed along the angle β. The angle β may range between 35 degrees and 55 degrees. A first-row rearward-facing seat 160 is disposed within a cabin or interior portion defined by the vehicle frame 100. The A-pillar 112 includes a proximal end 112b, attached to a shotgun bracket or front support member (not shown), and a distal end 112a connected to the roof rail 114. A secondary A-pillar 120, that includes a distal end 120a may be attached to the roof rail 114 or to the first A-pillar 112. The second A-pillar may be disposed along the angle ε. The angle c may range between 70 degrees and 85 degrees. The first-row rearward-facing seat 160 includes a rearward facing occupant. The occupant head H is positioned rearward of the front windshield 124 and below the roof 122.

As was discussed in the description of FIG. 1, a load form or platen L.F. is positioned above the vehicle frame 100. As the platen L.F. applies a force to the vehicle roof 122, the force $F_1$ is transferred from the roof through the C-pillar 135. The force $F_2$ is distributed through the secondary A-pillar 120 along the directional arrow $F_2$ to the hinge pillar 118. The hinge pillar 118 is arranged vertically with respect to the x-axis. The vertical orientation provides a column loading condition that as opposed to the bending moment condition applied to the A-pillar 12 of vehicle frame 10 in FIG. 1. Force $F_3$ is distributed through the A-pillar 112 to a shotgun attachment bracket 126 (FIG. 3).

Figure 3:
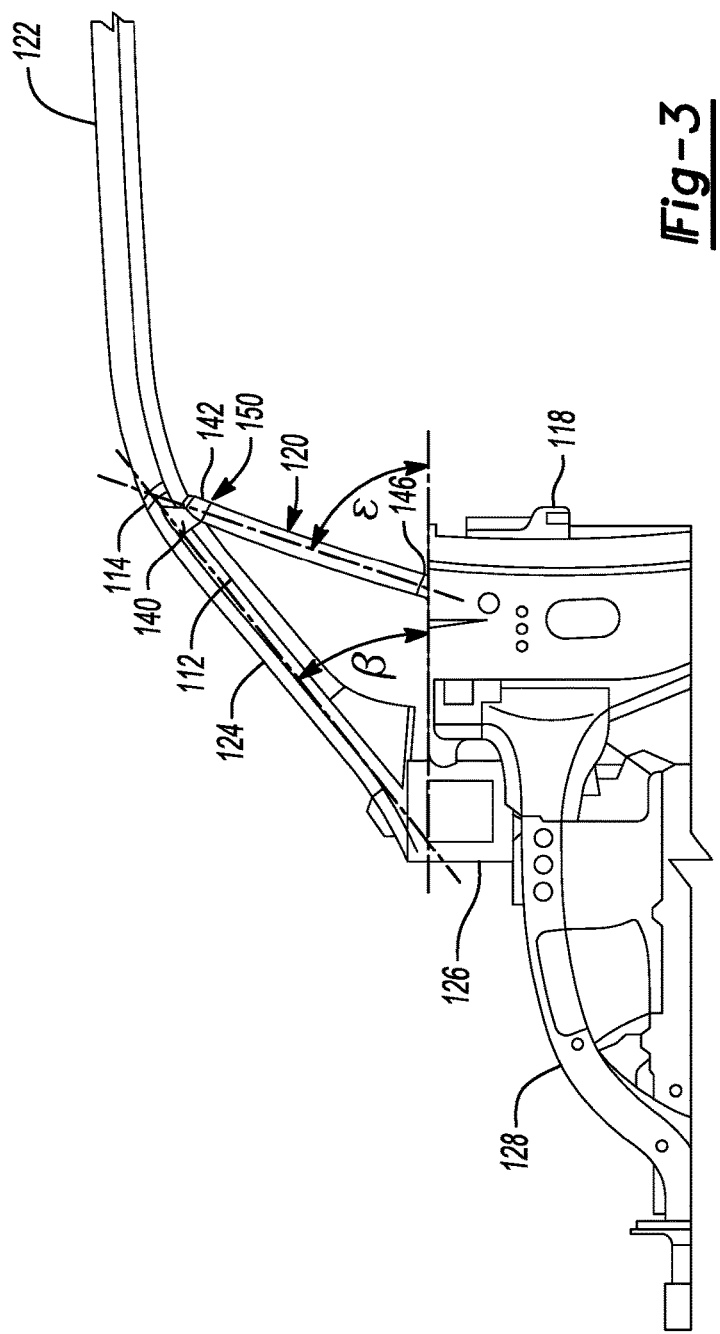
FIG. 3 is a detailed view of an autonomous dual A-pillar beam assembly taken along the lines of 3 in FIG. 2.
Figure 3A:
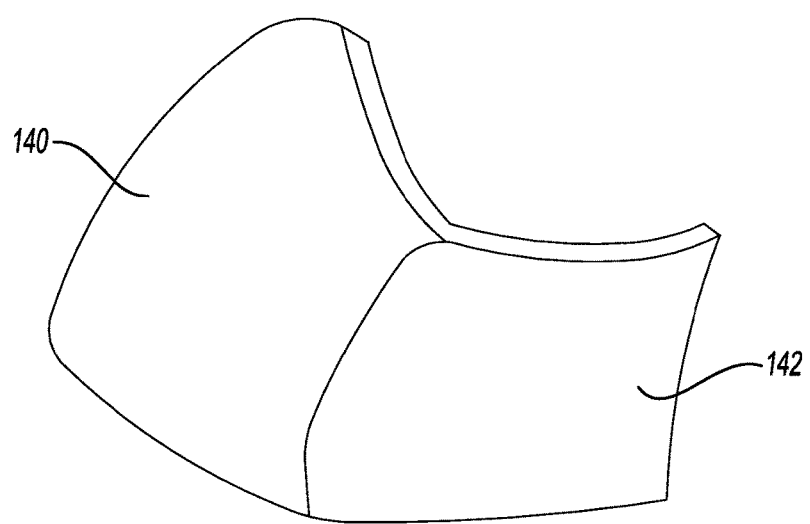
FIG. 3A is a detailed view of portions of the dual A-pillar beam.

Referring to FIGS. 3 and 3A, a detailed view of the vehicle frame 100 encircled by line 3 in FIG. 2 is illustrated. As was previously mentioned, the vehicle frame 100 includes a roof 122 that is attached to the roof rail 114. The first A-pillar 112 extends between the roof rail 114 to the shotgun attachment bracket or front support member 126. The shotgun attachment bracket may be a square or rectangular tube that is attached to a shotgun 128. The first A-pillar 112 may be disposed along the angle β.

The second A-pillar 120 may include a top or upper attachment bracket 150 and a bottom or lower attachment bracket 146. The top or upper attachment bracket 142 may include a first concave flange member 140 that is sized to receive either the first A-pillar 112 or the roof rail 114. The upper bracket 150 may also include a second concave flange 142 that is sized to receive the second A-pillar 120. The top or upper attachment bracket 150 may be attached or fastened to the roof rail 114, or first A-pillar 112, and the second A-pillar 120 by various methods including but not limited to welding, fasteners, or structural adhesive. Similarly, the lower attachment bracket 146 may be attached to the hinge pillar 118 by various methods including but not limited to welding, fasteners, or structural adhesive.

Figure 4:
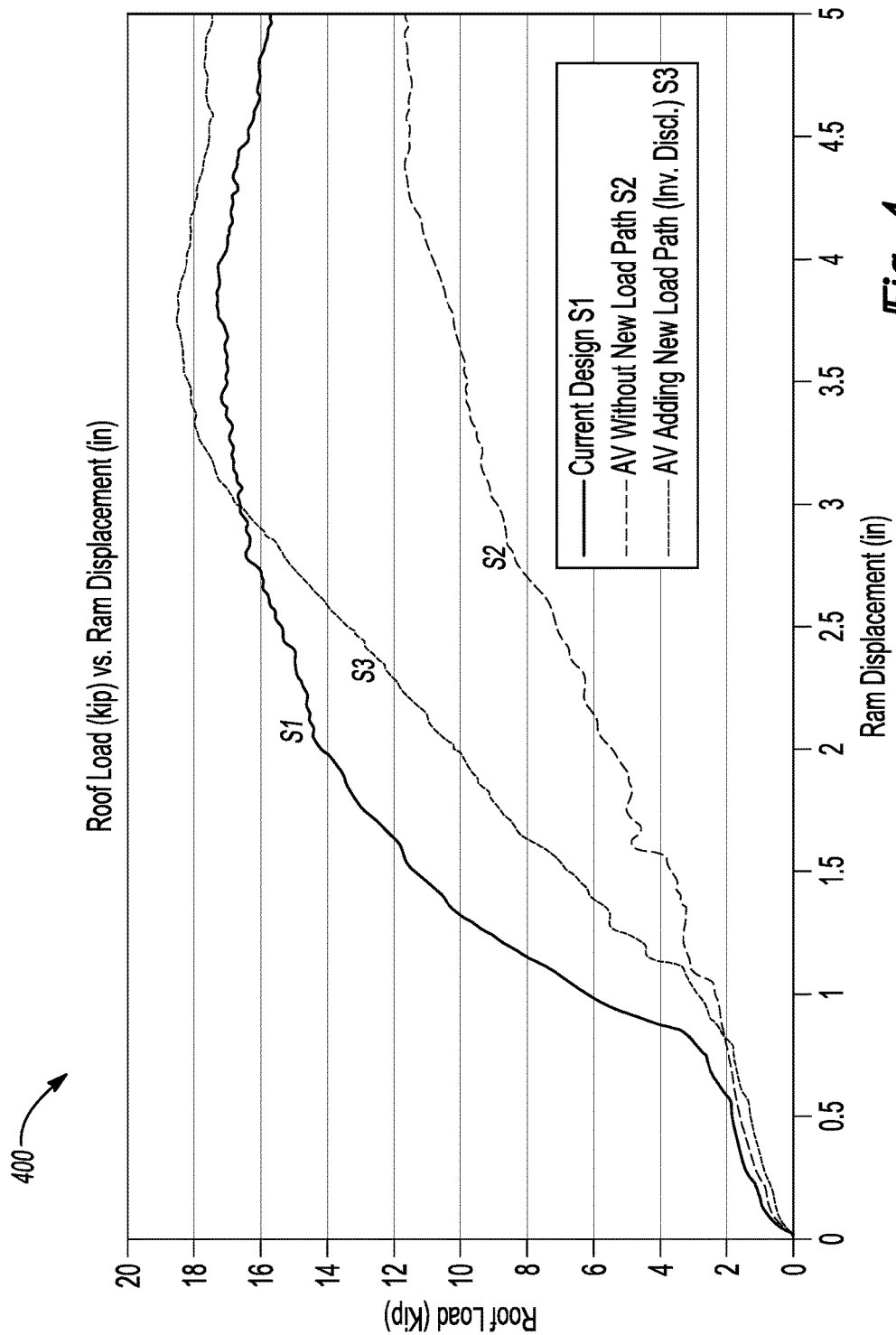
FIG. 4 is a graph comparing the displacement of a driven vehicle, an autonomous vehicle with a single A-pillar, and an autonomous vehicle with a secondary A-pillar.

Referring to FIG. 4, a load-displacement graph is identified by reference numeral 400. The load-displacement graph provides a comparison of vehicle frames made in accordance with the embodiments of FIG. 1 and FIG. 2 with and without the second A-pillar 120. The frames tested were of identical material thickness and material properties. The x-axis of the graph 400 denotes the displacement of the ram L.F. in inches (in). The y-axis of the graph 400 represents the load or force in thousand-pound force (Kip). In the load-displacement chart 400, line 51 represents the prior-art vehicle frame 10 in FIG. 1 indicating that the displacement in response to approximately 17.5 Kip was approximately 3.75 in. Line S2 represents the vehicle frame 100 in FIG. 2, without the second A-pillar 120, indicating that the displacement in response to approximately 11.8 Kip was approximately 4.3 in. Line S3 represents the vehicle frame 100 in FIG. 2, that includes the second A-pillar 120 indicating the displacement in response to 18.5 Kip was approximately 3.75 in.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a first A-pillar spanning between a roof rail and shotgun, and carrying a windshield;
   a second A-pillar, spanning between the roof rail and a hinge pillar, and a C-pillar, the frame assembly defining a side ingress/egress opening spanning between the second A-pillar and C-pillar; and
   an upper connection bracket including a first concaved flange portion attached to the first A-pillar and a second concaved flange portion attached to the second A-pillar.

2. The vehicle of claim 1, wherein an angle between the first A-pillar and a horizontal plane defined by a top of the hinge pillar is less than an angle between the second A-pillar and the plane.

3. The vehicle of claim 1, wherein the first A-pillar, second A-pillar, hinge pillar, shotgun, and a shotgun attachment bracket define a closed structural truss.

4. The vehicle of claim 1, wherein the second A-pillar is mounted to the first A-pillar.

5. The vehicle of claim 2, further comprising a lower connection bracket attached to the second A-pillar and the hinge pillar.

6. The vehicle of claim 1, wherein the vehicle includes a cabin and wherein the cabin further includes a forward-facing rear seat.

7. A vehicle comprising:
   a first A-pillar spanning between a roof rail and a front support member, and carrying a windshield;
   a frame assembly including a second A-pillar, spanning between the roof rail and a hinge pillar, and a C-pillar, the frame assembly defining a side ingress/egress opening of a cabin having a rearward-facing front seat, and the opening spanning between the second A-pillar and C-pillar without a B-pillar; and an upper connection bracket wherein the upper connection bracket includes a first concaved flange portion attached to the first A-pillar, and a second concaved flange portion connected to the second A-pillar.

8. The vehicle of claim 7, wherein an angle between the first A-pillar and a horizontal plane defined by a top of the hinge pillar is less than an angle between the second A-pillar and the plane.

9. The vehicle of claim 7, wherein the first A-pillar, second A-pillar, hinge pillar, front support member, and a shotgun attachment bracket define a closed structural truss.

10. The vehicle of claim 7, wherein the second A-pillar is mounted to the first A-pillar.

11. The vehicle of claim 9, further comprising a lower connection bracket attached to the second A-pillar and the hinge pillar.

* * * * *